(12) United States Patent
Patil et al.

(10) Patent No.: US 10,544,243 B2
(45) Date of Patent: Jan. 28, 2020

(54) HETEROGENEOUS ZIEGLER-NATTA CATALYST COMPOSITION, A PROCESS FOR ITS PREPARATION AND A PROCESS FOR POLYMERIZING OLEFIN USING THE SAME

(71) Applicant: Reliance Industries Limited, Mumbai (IN)

(72) Inventors: Yogesh Popatrao Patil, Gujarat (IN); Krishna Renganath Sarma, Gujarat (IN); Mahuya Bagui, Gujarat (IN); Viralkumar Patel, Gujarat (IN); Raksh Vir Jasra, Gujarat (IN); Ajit Behari Mathur, Gujarat (IN); Suketu Vakil, Mumbai (IN)

(73) Assignee: RELIANCE INDUSTRIES LIMITED (IN)

( * ) Notice: Subject to any disclaimer, the term of this patent is extended or adjusted under 35 U.S.C. 154(b) by 413 days.

(21) Appl. No.: 15/114,490

(22) PCT Filed: Feb. 16, 2015

(86) PCT No.: PCT/IB2015/051127
§ 371 (c)(1),
(2) Date: Jul. 27, 2016

(87) PCT Pub. No.: WO2015/121842
PCT Pub. Date: Aug. 20, 2015

(65) Prior Publication Data
US 2016/0347881 A1    Dec. 1, 2016

(30) Foreign Application Priority Data

Feb. 17, 2014    (IN) .......................... 537/MUM/2014

(51) Int. Cl.
*C08F 110/02*    (2006.01)
*C08F 4/648*    (2006.01)

(52) U.S. Cl.
CPC ............ *C08F 110/02* (2013.01); *C08F 4/648* (2013.01); *C08F 2500/01* (2013.01); *C08F 2500/17* (2013.01); *C08F 2500/18* (2013.01)

(58) Field of Classification Search
CPC .... C08F 110/02; C08F 4/648; C08F 2500/01; C08F 2500/17; C08F 2500/18
USPC .................................................... 526/125.3
See application file for complete search history.

(56) References Cited

U.S. PATENT DOCUMENTS

| | | | |
|---|---|---|---|
| 4,962,167 A | 10/1990 | Shiraishi et al. | |
| 6,559,249 B2 | 5/2003 | Yang et al. | |
| 2011/0183097 A1 | 7/2011 | Barre et al. | |

FOREIGN PATENT DOCUMENTS

| | | | |
|---|---|---|---|
| CN | 102558404 A | * | 7/2012 |
| EP | 0159110 | | 10/1985 |
| KR | 10-2008-0064249 | | 7/2008 |
| KR | 10-2011-0108172 | | 10/2011 |
| KR | 101144513 | | 5/2012 |
| KR | 101161752 | | 7/2012 |
| WO | 2011133313 | | 10/2011 |
| WO | 2011159287 | | 12/2011 |
| WO | 2013087185 | | 6/2013 |

OTHER PUBLICATIONS

CN-102558404 A—machine translation (Year: 2012).*
Padmanabhan et al., "Synthesis of Ultrahigh Molecular Weight Polyethylene Using Traditional Heterogeneous Ziegler-Natta Catalyst Systems", Ind. Eng. Chem. Res., 2009, 48, 4866-4871). (Year: 2009).*

(Continued)

*Primary Examiner* — Ling Siu Choi
*Assistant Examiner* — Ronald Grinsted
(74) *Attorney, Agent, or Firm* — Fish IP Law, LLP

(57) ABSTRACT

The present disclosure provides a Ziegler-Natta catalyst composition for preparing polymers of ethylene monomers having ultrahigh molecular weight, said composition comprises (i) a pro-catalyst component containing a reaction product of a magnesium containing compound and a titanium containing compound, characterized in that said pro-catalyst component comprises magnesium, titanium and chlorine in an amount ranging between 15 and 18 mole %; 20 and 23 mole %; and 60 and 64 mole %, respectively, all proportions being with respect to the total weight of the Ziegler-Natta catalyst composition; (ii) a co-catalyst component; and (iii) at least one external electron donor compound selected from the group of organosilane compounds having the general formula (I), wherein $R^1$, $R^2$, $R^3$ and $R^4$ are all the same or all are different, or some are the same, and are individually selected from the group consisting of linear or branched alkyl groups, cycloalkyl groups, aryl groups, alkoxy and aryloxy groups.

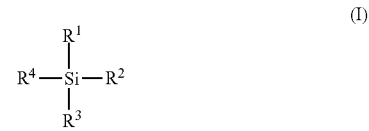

(I)

14 Claims, No Drawings

(56) References Cited

OTHER PUBLICATIONS

Padmanabhan, Sudhakar et al; Synthesis of Ultrahigh Molecular Weight Polyethylene Using Traditional Heterogeneous Ziegler-Natta Catalyst Systems; Ind. ENg. Chem. Res. 2009, 48, 4866-4871; Apr. 14, 2009.

Jamjah, Roghieh et al; Synthesizing UHMWPE Using Ziegler-Natta Catalyst System of MgCl2 (ethoxide type)/TiCl4/tri-isobutylaluminum; Macromol. Symp. 2008, 274, 148-153.

\* cited by examiner

HETEROGENEOUS ZIEGLER-NATTA CATALYST COMPOSITION, A PROCESS FOR ITS PREPARATION AND A PROCESS FOR POLYMERIZING OLEFIN USING THE SAME

FIELD OF THE DISCLOSURE

The present disclosure relates to a Ziegler-Natta catalyst composition and a process for its preparation. The present disclosure further relates to a process for preparing polyolefins having Ultrahigh Molecular Weight by using the Ziegler-Natta catalyst composition of the present disclosure.

BACKGROUND

Polyolefins with molecular weight higher than $1 \times 10^6$ g/mol are generally termed as Ultrahigh Molecular Weight (UHMW) polyolefins. Ultrahigh Molecular Weight Polyethylene (UHMWPE) is known to demonstrate excellent toughness and high impact strength. This is mainly due to the presence of long and linear polymeric chains, as longer chains serve to transfer load more effectively to the polymer backbone by strengthening intermolecular interactions.

UHMWPE with porous morphology and enhanced crystallinity complimented with reduced chain entanglement property is an example of another commercially desired polymer. Conventionally, it is prepared by ethylene polymerization catalyzed by metallocene or non-metallocene type homogeneous catalyst compositions, also known as single site catalyst compositions. The homogenous catalyst compositions mainly contain transition metal complexes such as complexes of Titanium (Ti), Zirconium (Zr), Hafnium (Hf) metals and the like. For activation of these homogenous single site catalyst compositions, relatively larger quantities of costly co-catalyst components such as methylaluminoxane are required. The use of relatively larger quantities of co-catalyst components results in less kinetic control and consequently reactor fouling by generation and deposition of polymer lumps on the reactor unit walls and stirrer shaft/paddle assembly. The use of a homogeneous catalyst composition, therefore, leads to increased polymerization cost.

Conventionally, heterogeneous Ziegler-Natta catalyst compositions based on titanium, magnesium and organo-aluminum co-catalyst have been developed. Since their inception till date, several modifications in the Ziegler-Natta catalyst compositions have been proposed in order to obtain specific properties in polymers, which are desired for specific applications.

The activity of these catalyst compositions to a great extent depends on the stability of Titanium $(Ti^{+3})/(Ti^{+2})$ ion geometry, which is responsible for the growth of the polymer chain during the polymerization process. To improve the stability of Titanium $(Ti^{+3})/(Ti^{+2})$ ion in the catalyst composition, electron donors are preferably added, either before the activation of the pro-catalyst component (internal electron donors) or after the activation of the pro-catalyst component (external electron donor). A variety of compounds have therefore been explored as internal and external electron donors for modification of heterogeneous Ziegler-Natta catalyst compositions.

Existing Knowledge:

U.S. Pat. No. 4,962,167 suggests a process for preparing an ultrahigh molecular weight polyethylene having narrow particle size distribution by polymerizing ethylene monomers in the presence of a catalyst composition comprising a solid catalyst component and an organometallic compound. The solid catalyst component as disclosed in the aforementioned US patent is obtained by contacting component A and component B, wherein component A is a reaction product of a magnesium dihalide and a titanium alkoxide and component B is a reaction product of an aluminum trihalide and a silicon alkoxide compound.

U.S. Pat. No. 6,559,249 suggests a process for preparing an ultrahigh molecular weight polyethylene with large bulk density and narrow particle size distribution by using an organometallic compound and a catalyst component. The catalyst component is prepared by reacting (i) a mixture of halogenated magnesium compound and an aluminum or a boron compound with alcohol to produce a magnesium compound, (ii) reacting the magnesium compound with an ester compound having at least one hydroxyl group and a silicon compound having an alkoxy group; and (iii) reacting the obtained reaction mixture with a titanium compound and a silicon compound. In the aforementioned US patent, esters and silane compounds are used as electron donors.

United States Patent Publication No. 2011159287 suggests a process for preparing ultrahigh molecular weight polyethylene by using a Ziegler-Natta catalyst composition that comprises a solid catalyst component obtained by reacting a magnesium compound, a titanium compound and an organo aluminum halogen compound, and a co-catalyst component. The use of external electron donors such as alcohols, ethers, esters, silanes and amines is also mentioned. However, the aforementioned United States Patent documents and patent application disclose the preparation of relatively dense ultrahigh molecular weight polyethylene with remarkably less porosity.

European Patent No. 0159110 suggests ultrahigh molecular weight polyolefin fine powders by using a specified Ziegler catalyst composition. The Ziegler catalyst used in the process of the aforementioned EP patent is prepared according to the teachings of Japanese Laid-open patent application 811/81 by reacting magnesium chloride and titanium chloride at low temperature and thereafter adding a small amount of monocarboxylate such as benzoate at high temperature. The aforesaid European patent document talks about the ultrahigh molecular weight polyethylene having a specified particle diameter and a specified particle size distribution and which is easily processable. However, the aforesaid European patent document is silent on the manufacturing of ultrahigh molecular polyethylene with improved porosity and crystallinity, and with flaky morphology.

Korean Patent No. 101161752 suggests a method for preparing an ultrahigh molecular weight polyethylene having high productivity and high apparent density (bulk density) by using a Ziegler-Natta catalyst composition. Though, the aforesaid Korean patent discloses the use of a heterogeneous Ziegler-Natta catalyst composition for the production of ultrahigh molecular weight polyethylene, it is silent on the production of ultrahigh molecular weight polyethylene having improved porosity and crystallinity, and flaky morphology.

Another Korean Patent No. 101144513 suggests an ultrahigh molecular weight polyethylene attributed with narrow molecular weight distribution which is prepared by polymerizing ethylene monomers in the presence of a heterogeneous Ziegler-Natta catalyst composition comprising a reaction product of a magnesium alcoholate, a titanium halide, an organoaluminum compound and an organo-silane compound. However, the aforesaid Korean patent document is also silent on the manufacturing of ultrahigh molecular weight polyethylene having improved porosity, crystallinity, and flaky morphology.

PCT Publication No. 2013087185 suggests a process for preparing ultrahigh molecular weight polyethylene with high powder bulk density by using a Ti—Mg based heterogeneous Ziegler-Natta catalyst composition. The ultrahigh molecular weight polyethylene as suggested in the aforesaid PCT document is dense in nature and characterized with poor crystallinity and porosity.

From the forgoing description, it is evident that though a number of records pertaining the production of ultrahigh molecular weight polyethylene using heterogeneous Ziegler-Natta catalyst compositions have been suggested, but none of these documents disclose the use of heterogeneous Ziegler-Natta catalyst compositions which when used in the production of polyolefins gives kinetically controlled polymerization reaction to provide polyolefins with significantly improved molecular weight along with flaky morphology, enhanced porosity and crystallinity, and lower to moderate bulk density, which are otherwise obtained by the use of expensive single-site homogeneous catalyst compositions.

Therefore, there is felt a need to provide a heterogeneous Ziegler-Natta catalyst composition which is an economic alternative to the existing expensive single site homogeneous catalyst system for the production of polyethylene having ultrahigh molecular weight and with porous and flaky morphology.

Objects:

Some of the objects of the present disclosure are described herein below:

It is an object of the present disclosure to ameliorate one or more problems of the prior art or to at least provide a useful alternative.

Another object of the present disclosure is to provide a heterogeneous Ziegler-Natta catalyst composition with modified properties for producing polymers of ethylene monomers having ultrahigh molecular weight, increased intrinsic viscosity, enhanced porosity and crystallinity, lower to moderate bulk density and reduced chain entanglement.

Still another object of the present disclosure is to provide a heterogeneous Ziegler-Natta catalyst composition with better control on the polymerization process thereby obtaining a polymer of ethylene monomers with the desired bulk density and without reactor fouling.

Yet another object of the present disclosure is to provide a process for the preparation of heterogeneous Ziegler-Natta catalyst composition.

A further object of the present disclosure is to provide polymers of ethylene monomers having ultrahigh molecular weight, increased intrinsic viscosity, lower to moderate bulk density and having a unique flaky morphology with enhanced porosity, and reduced chain entanglement.

A still further object of the present disclosure is to provide a process for preparing polymers of ethylene monomers having ultrahigh molecular weight by using a heterogeneous Ziegler-Natta catalyst composition of the present disclosure.

A yet further object of the present disclosure is to provide a process for preparing polymers of ethylene monomers having ultrahigh molecular weight by using a heterogeneous Ziegler-Natta catalyst composition of the present disclosure that employs relatively lesser amounts of a co-catalyst component as compared to the conventional polymerization processes that employ single site catalyst compositions.

Another object of the present disclosure is to provide a process for preparing polymers of ethylene monomers having ultrahigh molecular weight, wherein the process is simple, cost-efficient and that eliminates the risk of polymerization unit fouling.

Other objects and advantages of the present disclosure will be more apparent from the following description which is not intended to limit the scope of the present disclosure.

Definitions

As used in the present disclosure, the following words and phrases are generally intended to have the meaning as set forth below, except to the extent that the context in which they are used indicates otherwise.

The term "American Society for Testing and Materials (ASTM)" in the context of the present disclosure refers to a standard used to calculate molecular weight of polyolefins from measured intrinsic viscosity.

The term "intrinsic viscosity" in the context of the present disclosure refers to the intrinsic viscosity of the polymer of ethylene monomers having ultrahigh molecular weight, as measured by a standard method ASTM-D 4020-01a. The measured intrinsic viscosity of the polymer of ethylene monomers having ultrahigh molecular weight is used to calculate the molecular weight of the polymer of ethylene monomers having ultrahigh molecular weight, based on the intrinsic viscosity of a 0.02% solution in decalin at 135° C. and using the equation $M=K[\eta]^\alpha$; where $\eta$ is the intrinsic viscosity, $K=53700$ and $\alpha=1.37$.

The term "crystallinity" in the context of the present disclosure refers to the degree of structural order in the polymers of ethylene monomers having ultrahigh molecular weight. The crystallinity of the polymer of ethylene monomers having ultrahigh molecular weight is represented by a fraction or percentage as a measure of how effectively and systematically the polymer chains are aligned or stacked. The crystallinity of the polymer of ethylene monomers having ultrahigh molecular weight is measured by using Differential Scanning calorimetry (DSC). A standard value of 290 J/g for highly crystalline polyethylene (as reported in literature) is used to compute the % crystallinity of the polymer of ethylene monomer having ultrahigh molecular weight. The results are also validated through XRD techniques.

The term "bulk density" in the context of the present disclosure refers to the "apparent density" and is measured as per ASTM D-1895-96. Apparent density is a measure of the fluffiness of a material. It is the weight per unit volume of a material, including voids inherent in the material as tested.

SUMMARY

In accordance with one aspect of the present disclosure there is provided a Ziegler-Natta catalyst composition for preparing polymers of ethylene monomers having ultrahigh molecular weight, said composition comprising:
  i. a pro-catalyst component containing a reaction product of a magnesium containing compound and a titanium containing compound, characterized in that said pro-catalyst component comprises magnesium, titanium and chlorine in an amount ranging between 15 and 18 mole %; 20 and 23 mole %; and 60 and 64 mole %, respectively, all proportions being with respect to the total weight of the Ziegler-Natta catalyst composition;
  ii. a co-catalyst component comprising at least one organoaluminum compound; and iii. at least one external electron donor compound selected from the group of organosilane compounds having the general formula (I),

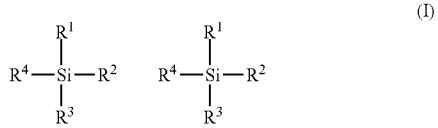

(I)

wherein $R^1$, $R^2$, $R^3$ and $R^4$ are all the same, or all are different, or some are the same, and are individually selected from the group consisting of linear or branched alkyl groups, cycloalkyl groups, aryl groups, alkoxy and aryloxy groups.

In one embodiment of the disclosure, the molar ratio of magnesium, titanium and chlorine is 1:1.3:3.7.

In one embodiment of the present disclosure, the magnesium containing compound can be selected from a magnesium alkoxide and a magnesium halide.

The magnesium containing compound can be selected from magnesium ethoxide and magnesium chloride.

The titanium containing compound can be a titanium halide.

In one embodiment the titanium containing compound is titanium tetrachloride.

The aluminum to titanium molar ratio can range from 50:1 to 100:1.

The silicon to titanium molar ratio can range from 1:1 to 4:1.

In accordance with another aspect of the present disclosure there is provided a process for preparing a Ziegler-Natta catalyst composition of the present disclosure, said process comprising the following steps:
  i. reacting a pre-determined weight proportion of at least one magnesium containing compound and at least one titanium containing compound at elevated temperature and pressure for a pre-determined period of time to obtain a pro-catalyst component, wherein at least one of the titanium containing compound and the magnesium containing compound is also a chloride compound;
  ii. isolating said pro-catalyst component;
  iii. adding a pre-determined weight proportion of an organoaluminum compound to an inert hydrocarbon liquid medium to obtain a mixture;
  iv. adding to said mixture, said pro-catalyst component and agitating the obtained mass for a pre-determined period of time to obtain a mass containing an activated pro-catalyst component; and
  v. adding a pre-determined weight proportion of at least one external electron donor compound to the mass and agitating further for a pre-determined period of time to obtain a Ziegler-Natta catalyst composition.

The magnesium and titanium containing compounds can be in amounts sufficient for obtaining the Ziegler-Natta catalyst composition having 15 to 18 mole % of magnesium, 20 to 23 mole % of titanium, and 62 to 64 mole % of chlorine, based on the total weight of the Ziegler-Natta catalyst composition.

The orgaoaluminum compound can be added in an amount sufficient for obtaining the Ziegler-Natta catalyst composition having aluminum to titanium molar ratio in the range of 50:1 to 100:1.

The external electron donor compound can be an organosilane compound of the general formula (I),

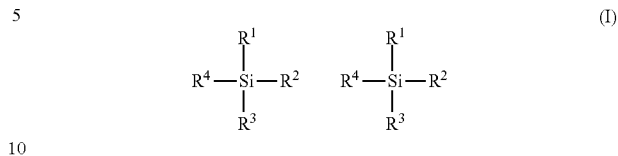

(I)

wherein $R^1$, $R^2$, $R^3$ and $R^4$ are all the same, or all are different, or some are the same, and are individual selected from the group consisting of linear or branched alkyl groups, cycloalkyl groups, aryl groups, alkoxy and aryloxy groups.

The organosilane compound can be added in an amount sufficient for obtaining the Ziegler-Natta catalyst composition having silicon to titanium molar ratio in the range of 1:1 and 4:1.

In accordance with another aspect of the present disclosure, there is provided a process for polymerization of ethylene monomers in the presence of the Ziegler-Natta catalyst composition of the present disclosure, said process comprising the following steps:
  contacting ethylene monomers with a Ziegler-Natta catalyst composition of the present disclosure under polymerization reaction conditions of temperature ranging from 50 to 80° C., ethylene pressure ranging from 1 to 15 bars for a time period ranging from 1 to 5 hours and with agitation speed ranging from 300 to 1000 revolutions per minutes (rpm) to obtain a polymer of ethylene having ultrahigh molecular weight.

In accordance with yet another aspect of the present disclosure, there is provided a polymer of ethylene monomers having ultrahigh molecular weight prepared in accordance with the polymerization process of the present disclosure, said polymer of ethylene monomers is characterized with a molecular weight ranging from 2 to 13 million g/mole; an intrinsic viscosity ranging from 18 to 54 dl/g; a bulk density ranging from 0.1 to 0.3 g/cc; crystallinity ranging from 50 to 70%; and a porous and flaky morphology.

BRIEF DESCRIPTION OF ACCOMPANYING DRAWINGS

FIG. 1: Illustrates the effect of polymerization conditions on UHMWPE properties, in the form of Table-2.

DETAILED DESCRIPTION

The present disclosure envisages a heterogeneous Ziegler-Natta catalyst composition with modified properties for polymerization of ethylene monomers to produce a polymer of ethylene monomers having ultrahigh molecular weight and attributed with significantly enhanced crystallinity, porosity and flaky morphology. The present disclosure also envisages a process for preparing the heterogeneous Ziegler-Natta catalyst composition of the present disclosure and a process for polymerizing ethylene monomers to produce a polymer of ethylene monomers having ultrahigh molecular weight.

In a first aspect, the present disclosure provides a Ziegler-Natta catalyst composition for preparing polymers of ethylene monomers having ultrahigh molecular weight, said composition comprising:

(a) a pro-catalyst component containing a reaction product of a magnesium containing compound and a titanium containing compound, characterized in that said pro-catalyst component comprises magnesium, titanium and chlorine in an amount varying between 15 and 18 mole %, 20 and 23 mole %, and 60 and 64 mole %, respectively, all proportions being with respect to the total weight of the Ziegler-Natta catalyst composition;
(b) a co-catalyst component comprising at least one organoaluminum compound; and
(c) at least one external electron donor compound.

In accordance with one of the embodiments of the present disclosure, the pro-catalyst component comprises magnesium, titanium and chlorine in the molar ratio of 1:1.3:3.7.

The pro-catalyst component of the Ziegler-Natta catalyst composition of the present disclosure is a solid reaction product obtained by reacting at least one titanium containing compound and at least one magnesium containing compound under conditions suitable for forming the pro-catalyst component.

The preparation of titanium and magnesium containing pro-catalyst components is well-known in the art and any conventional method may be employed to prepare the pro-catalyst component of the present disclosure.

In accordance with the present disclosure, the pro-catalyst component is prepared by reacting a magnesium containing compound and a titanium containing compound under predetermined reaction conditions of temperature and time.

The halogen, particularly chlorine which is required in the pro-catalyst component of the Ziegler-Natta catalyst composition of the present disclosure is obtained by reacting a magnesium containing compound and a titanium containing compound wherein at least one of the titanium containing compound and the magnesium containing compound useful for the preparation of the pro-catalyst component is a chlorine containing compound.

Examples of suitable magnesium containing compounds for the purpose of the present disclosure include at least one compound selected from the group consisting of magnesium halides, magnesium alkoxides, magnesium aryloxides, magnesium oxides, magnesium oxyhalides and magnesium salts of inorganic acids.

In accordance with an exemplary embodiment of the present disclosure, magnesium alkoxide compounds are used. Examples of suitable magnesium alkoxides for the purpose of the present disclosure include magnesium ethoxide, magnesium methoxide, magnesium butoxide, and magnesium propoxide.

When magnesium alkoxide is used as the magnesium containing compound to prepare the procatalyst component, the reaction of the magnesium alkoxide with the titanium containing compound, for example titanium halide, generates magnesium halide.

In accordance with another exemplary embodiment of the present disclosure, magnesium halides are used. Examples of suitable magnesium halides include at least one compound selected from the group consisting of magnesium chloride, magnesium bromide, magnesium iodide and magnesium oxyhalides such as magnesium oxychloride, magnesium oxybromide. In an exemplary embodiment, the halogenated magnesium compound is magnesium chloride.

Examples of suitable titanium containing compounds for the purpose of the present disclosure include at least one compound selected from the group consisting of titanium halides, titanium alkoxides, titanium aryloxide, titanium oxides and titanium halo oxides. In accordance with one of the embodiments of the present disclosure, the titanium containing compound is a titanium halide. In an exemplary embodiment, the titanium containing compound is a titanium tetrachloride.

In accordance with one of the embodiments of the present disclosure, the liquid titanium tetrachloride is added to magnesium ethoxide suspended in an inert hydrocarbon liquid medium (solvent). The obtained reaction mixture is then heated at a temperature of 110° C. for a time period of 6 to 8 hours to obtain a pro-catalyst component. During the reaction, magnesium ethoxide reacts with titanium tetrachloride and gets converted into magnesium dichloride. The obtained reaction mixture comprising the pro-catalyst component is further heated at a temperature ranging from 110° C. to 130° C. for a time period of 24 to 72 hours. The obtained pro-catalyst component is then separated, either by filtration or centrifugation, and washed with an inert hydrocarbon liquid medium.

In accordance with another embodiment of the present disclosure, the liquid titanium tetrachloride is added to magnesium dichloride suspended in an inert hydrocarbon liquid medium. The obtained reaction mixture is then heated at a temperature of 110° C. for a time period of 6 to 8 hours to obtain a pro-catalyst component. The reaction mixture comprising the pro-catalyst component is further heated at a temperature ranging from 110 to 130° C. for a time period of 24 to 72 hours. The obtained pro-catalyst component is then separated, either by filtration or centrifugation, and washed with an inert hydrocarbon liquid medium.

Suitable examples of inert hydrocarbon liquid medium used for the purpose of the present disclosure include pentane, hexane, cyclohexane, methyl cyclohexane, heptane, octane, decane, isopentane and varsol. The preferred inert hydrocarbon liquid medium is varsol.

The co-catalyst component in the Ziegler-Natta catalyst composition of the present disclosure includes at least one compound selected from the group consisting of methylaluminoxane, triisobutylaluminoxane, ethylaluminoxane, and polymethylaluminoxane. In an exemplary embodiment, the co-catalyst component is poly-methylaluminoxane. The molar ratio of aluminum to titanium in the Ziegler-Natta composition is in the range of 50:1 to 100:1.

The external electron donor in the Ziegler-Natta catalyst composition of the present disclosure is an organosilane compound of the general formula (I),

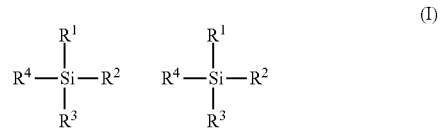

wherein $R^1$, $R^2$, $R^3$ and $R^4$ are all the same, or all are different, or some are the same, and are individually selected from the group consisting of linear or branched alkyl groups, cycloalkyl groups, aryl groups, alkoxy groups and aryloxy groups. Examples of suitable organosilane compounds in accordance with the present disclosure include at least one compound selected from the group consisting of tetraethoxysilane, cyclohexylmethyl dimethoxysilane, dicyclopentyl dimethoxysilane, isobutylisopropyl dimethoxy silane, n-propyltriethoxy silane, isobutyltriethoxy silane, phenyltriethoxy silane, diisopropyldimethoxy silane, diethyldimethoxy silane, diisobutyldimethoxy silane, aminopropyltriethoxy silane, diphenyldimethoxy silane, and methyltrimethoxy silane.

The molar ratio of silicon to titanium in the Ziegler-Natta catalyst composition of the present disclosure typically ranges between 1:1 and 4:1. In an exemplary embodiment, the molar ratio of silicon to titanium is 2:1.

In another aspect, the present disclosure provides a process for preparing the Ziegler-Natta catalyst composition:

The process for preparing the Ziegler-Natta catalyst composition of the present disclosure comprises the steps of preparing a pro-catalyst component, treating the pro-catalyst component with a co-catalyst component to obtain an activated pro-catalyst component and adding an external electron donor to the activated pro-catalyst component to obtain the Ziegler-Natta catalyst composition.

The pro-catalyst component of the Ziegler-Natta catalyst composition of the present disclosure is prepared in accordance with the procedure as described above.

The prepared pro-catalyst component of the Ziegler-Natta catalyst composition of the present disclosure is then treated with a co-catalyst component to obtain an activated pro-catalyst component. The co-catalyst component is mixed in an inert hydrocarbon liquid medium; the co-catalyst component being partially soluble in the inert hydrocarbon liquid medium. To the obtained mixture of the co-catalyst component is then added the pro-catalyst component. The obtained mass comprising the co-catalyst component and the pro-catalyst component is agitated for a time period of 2 to 6 minutes at ambient temperature and pressure (25 to 30° C. and atmospheric pressure of nitrogen) to obtain a mass containing an activated pro-catalyst component.

The co-catalyst component in accordance with the present disclosure is an organoaluminum compound that includes at least one compound selected from the group consisting of methylaluminoxane, triisobutylaluminoxane, ethylaluminoxane, and polymethylaluminoxane. In accordance with one of the embodiments of the present disclosure, the co-catalyst component is polymethylaluminoxane. The inert hydrocarbon used for mixing of the co-catalyst component may be the same or different from the inert hydrocarbon liquid medium used for the preparation of the pro-catalyst component. Further, the inert hydrocarbon liquid medium used for preparing the Ziegler-Natta catalyst composition of the present disclosure is also used as a polymerization medium. Examples of suitable inert hydrocarbon liquid medium in accordance with the present disclosure include pentane, hexane, cyclohexane, methyl cyclohexane, heptane, octane, decane, isopentane, varsol and the like. In accordance with one of the embodiments of the present disclosure, the inert hydrocarbon liquid medium is varsol.

The co-catalyst component is added in an amount sufficient for obtaining the Ziegler-Natta catalyst composition of the present disclosure having aluminum to titanium molar ratio in the range of 50:1 to 100:1.

To the obtained mass containing the activated pro-catalyst component is then added a pre-determined weight proportion of an external electron donor. The external electron donor is added in an amount sufficient for obtaining the Ziegler-Natta catalyst composition having silicon to titanium molar ratio in the range of 1:1 and 4:1. The addition of the external electron donor is carried out for a time period ranging between 1 and 10 minutes, at ambient temperature and pressure, and under inert atmosphere. In an exemplary embodiment, the addition of the external electron donor is carried out for a time period ranging between 2 and 6 minutes. The external electron donor in accordance with the present disclosure is an organosilane compound having the general formula (I),

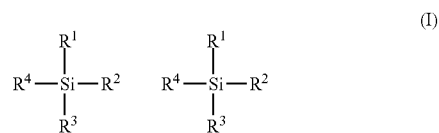

wherein $R^1$, $R^2$, $R^3$ and $R^4$ are all the same or all are different, or some are the same, and are individually selected from the group consisting of linear or branched alkyl groups, cycloalkyl groups, aryl groups, alkoxy and aryloxy groups. Examples of suitable organosilane compounds in accordance with the present disclosure include at least one compound selected from the group consisting of tetraethoxysilane, cyclohexylmethyl dimethoxysilane, dicyclopentyl dimethoxysilane, isobutylisopropyl dimethoxy silane, n-propyltriethoxy silane, isobutyltriethoxy silane, phenyltriethoxy silane, diisopropyldimethoxy silane, diethyldimethoxy silane, diisobutyldimethoxy silane, aminopropyltriethoxy silane, diphenyldimethoxy silane and methyltrimethoxy silane.

Without being bound by any theory, it is observed that the sequence of addition of various components such as pro-catalyst, co-catalyst and external electron donors modifies the catalytic properties and subsequently the polymer products. In accordance with one of the embodiments of the present disclosure, in a first step, the co-catalyst component is added in the inert hydrocarbon liquid medium. To the obtained mixture of the co-catalyst component is then added the pro-catalyst component and subsequently the external electron donor.

The Ziegler-Natta catalyst composition in accordance with the present disclosure is further used for polymerization of ethylene monomers to produce a polymer of ethylene monomers having ultrahigh molecular weight.

In another aspect, the present disclosure provides a process for polymerization of ethylene monomers using the Ziegler-Natta catalyst composition of the present disclosure to produce a polymer of ethylene monomers having ultrahigh molecular weight.

In the present disclosure, the polymer of ethylene having ultrahigh molecular weight is also referred to as ultrahigh molecular weight polyethylene (UHMWPE).

The Ziegler-Natta catalyst composition prepared in accordance with the process of the present disclosure is charged in a polymerization reactor, preferably Buchi polyclave. The polymerization reactor charged with the catalyst composition is then pressurized with ethylene monomers. The polymerization of ethylene monomers is carried out under the polymerization reactions conditions of temperature ranging between 50° C. and 80° C., ethylene pressure ranging from 1 to 15 bars for a time period ranging from 1 to 5 hours, and with agitation ranging from 300 to 1000 revolutions per minutes (rpm). In an exemplary embodiment, the temperature ranges between 60° C. and 80° C.

The polymer of ethylene monomers having ultrahigh molecular weight prepared in accordance with the process of the present disclosure demonstrates tremendous advantages in terms of the properties of the final product and efficient manufacturing process.

The polymer of ethylene monomers having ultrahigh molecular weight prepared in accordance with the present disclosure demonstrates a significant increase in its molecular weight ranging from 2 to 13 million g/mole, as measured according to ASTM-D 4020-01a as indicated from the increased intrinsic viscosity from 18 to 54 dl/g. In accordance with one of the embodiments of the present disclosure, the polymer of ethylene monomers having ultrahigh molecular weight is characterized with an intrinsic viscosity of at least 52 dl/g corresponding to an ASTM molecular weight of about 12 million g/mole.

The bulk density of the polymer of ethylene monomers having ultrahigh molecular weight, prepared in accordance with the process of the present disclosure, typically falls in the range of 0.1 to 0.3 g/cc as compared to the bulk density of polymer of ethylene monomers having ultrahigh molecular weight prepared without using an external donor and the requisite co-catalyst which is found to be at least 0.4 g/cc.

Further, the polymer of ethylene monomers having ultrahigh molecular weight prepared in accordance with the present disclosure is characterized by improved crystallinity of 50 to 70%, as compared to 51% crystallinity in the polymer of ethylene monomers having ultrahigh molecular weight obtained in controlled experiments without using the external electron donor and the requisite co-catalyst compounds. The improved crystallinity is attributed to significant reduction in chain entanglement. The polymer of ethylene monomers having ultrahigh molecular weight of the present disclosure is also characterized with increased porosity and flaky morphology. Further, the polymer of ethylene monomers having ultrahigh molecular weight of the present disclosure exhibits high enthalpy of melting in the range of 144-230 J/g compared to conventional ultrahigh molecular weight polyethylene (enthalpy of melting ~140 J/g) thereby indicating high degree of chain disentanglement along with uniform alignment of chains resulting in enhanced crystallinity.

The process for the polymerization of ethylene monomers carried out by using the Ziegler-Natta catalyst composition of the present disclosure employs relatively lesser amounts of the co-catalyst component as compared to the conventional polymerization processes that employ single site catalyst compositions. The use of relatively lesser amounts of the co-catalyst component makes the process cost efficient and also results in better control on the polymerization process thereby preventing polymerization unit fouling.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example-1

Preparation of the Ziegler-Natta Catalyst Composition (Ex-1)

This example describes a process for the preparation of the Ziegler-Natta catalyst composition in accordance with an embodiment of the present disclosure:
(1) Preparation of the Pro-Catalyst Component:
(a) Preparation of the Pro-Catalyst Component Using Magnesium Ethoxide:

227 g of $TiCl_4$ was added in 10 g magnesium ethoxide (suspended in 250 ml varsol). The obtained reaction mixture was heated to a temperature of 110° C. under constant stirring for 6 to 8 hours to obtain a solid pro-catalyst component. The obtained solid pro-catalyst component after tempering at 110° C. to 130° C. for 24-72 hours was then separated from the reaction mixture by filtration and washed with hexane to remove surface adsorbed titanium species. This resulted in a pro-catalyst component having Mg, Ti and Cl in the molar ratio of about 1:1.3:3.7.

(b) Preparation of the Pro-Catalyst Component Using Magnesium Dichloride:

227 g of $TiCl_4$ was added in 6.6 g of $MgCl_2$ (suspended in 250 ml varsol). The obtained reaction mixture was heated to a temperature of 110° C. under constant stirring for 6 to 8 hours to obtain a solid pro-catalyst component. The obtained solid pro-catalyst component after tempering at 110° C. to 130° C. for 24-72 hours was then separated from the reaction mixture by filtration and washed with hexane to remove surface adsorbed titanium species. This resulted in a pro-catalyst component having Mg, Ti and Cl in the molar ratio of about 1:1.3:3.7.

(2) Preparation of the Ziegler-Natta Catalyst Composition:

7.5 gm (17.3 mmol) of polymethylaluminoxane (as a 10% solution in toluene) was suspended in 500 ml of varsol under nitrogen gas. Thereafter, 2.6 ml (0.173 mmol of Ti) of the pro-catalyst component (as a slurry in hexane) was added to the Varsol solution containing the polymethylaluminoxane. The resultant mass was then agitated at ambient temperature under atmospheric pressure for 2 to 5 minutes under nitrogen gas to obtain an activated pro-catalyst component. To the resultant mass comprising the activated pro-catalyst component was then added 0.073 gm (0.35 mmol Si) of tetraethoxysilane (1.3 ml of 10% solution in hexane) progressively for a time period of 2 to 5 minutes. Followed by the addition of tetraethoxysilane, the mass was agitated continuously at ambient temperature under nitrogen gas to obtain the Ziegler-Natta catalyst composition. The obtained Ziegler-Natta catalyst composition comprises Al/Ti ratio of 100 and Si/Ti ratio of 2.

Examples 2-4

Preparation of the Ziegler-Natta Catalyst Compositions (Ex-2 to Ex-4)

The Ziegler-Natta catalyst compositions (Ex-2 to Ex-4) were prepared in the same manner as described in example-1, except the weight proportion of the tetraethoxysilane used. In examples-2 and 3, the tetraethoxysilane was added in an amount of 0.14 gm (0.69 mmol of Si), and 0.036 gm (0.175 mmole Si), respectively. In example-4 (Ex-4), no external electron donor was used.

Example 5

Preparation of the Ziegler-Natta Catalyst Composition (Ex-5)

The Ziegler-Natta catalyst composition (Ex-5) was prepared in the same manner as described in example-3 for the preparation of the Ziegler-Natta catalyst composition (Ex-3), except the weight proportion of the polymethylaluminoxane used. The polymethylaluminoxane was added in an amount of 3.75 gm (8.6 mmol). The Si/Ti molar ratio was maintained at 1:1.

Examples 6-10

Preparation of the Ziegler-Natta Catalyst Compositions (Ex-6 to Ex-10)

The Ziegler-Natta catalyst compositions (Ex-6 to Ex-10) were prepared in the same manner as described in example-5, except the types of different external electron donor compounds used such as methyltrimethoxy silane, cyclohexylmethyldimethoxy silane, dicyclopentyldimethoxy silane and diphenyldimethoxysilane. The Si/Ti and Al/Ti molar ratios were maintained at 2:1 and 50:1, respectively.

The Ziegler-Natta catalyst compositions of Examples 1-10 are tabulated in Table-1:

TABLE 1

Ziegler-Natta catalyst compositions (Ex-1 to Ex-10)

| | Ziegler-Natta catalyst composition | | | | | | Inert hydro. liquid medium (solvent) |
|---|---|---|---|---|---|---|---|
| Ex. Nos. | Ti (mmol) (A) | Al (mmol) (B) | Si* (mmol) (C) | External electron donor | Al/Ti molar ratio | Si/Ti molar ratio | Varsol (Lit) (D) |
| Ex-1 | 0.173 | 17.3 | 0.35 | Tetraethoxy silane | 100 | 2 | 0.5 |
| Ex-2 | 0.173 | 17.3 | 0.69 | Tetraethoxy silane | 100 | 4 | 0.5 |
| Ex-3 | 0.173 | 17.3 | 0.175 | Tetraethoxy silane | 100 | 1 | 0.5 |
| Ex-4 | 0.173 | 17.3 | 0 | None | 100 | 0 | 0.5 |
| Ex-5 | 0.173 | 8.6 | 0.35 | Tetraethoxy silane | 50 | 1 | 0.5 |
| Ex-6 | 0.173 | 8.6 | 0.35 | Tetraethoxy silane | 50 | 2 | 0.5 |
| Ex-7 | 0.173 | 8.6 | 0.35 | Methyltrimethoxy silane | 50 | 2 | 0.5 |
| Ex-8 | 0.173 | 8.6 | 0.35 | Cyclohexylmethyldimethoxy silane | 50 | 2 | 0.5 |
| Ex-9 | 0.173 | 8.6 | 0.35 | Dicyclopentyldimethoxy silane | 50 | 2 | 0.5 |
| Ex-10 | 0.173 | 8.6 | 0.35 | Diphenyldimethoxy silane | 50 | 2 | 0.5 |

Examples 11-24 (Ex-11 to Ex-24)

These examples describe a process for the preparation of polymer of ethylene monomers having ultrahigh molecular weight (UHMWPE).

Example-11 (Ex-11)

The resultant mass comprising the Ziegler-Natta composition of example-1 (Ex-1) was charged into a Buchi polyclave. The autoclave was further charge with ethylene. The polymerization of ethylene monomer was performed at 2.5 bar ethylene pressure at 75° C. with agitation speed of 500 rpm and for 2 hours.

Examples 12-15 (Ex-12 to Ex-15)

The polymerization of ethylene monomers was carried out in the same manner as described in Example-11, except the followings: (i) using 0.2 bar $H_2$ (Ex-12); (ii) polymerization time: 1 hour (Ex-13) and 0.5 hour (Ex-14); and (iii) the polymerization temperature: 60° C. (Ex-15).

Table-2 illustrating the effect of polymerization conditions on UHMWPE properties is shown in FIG. 1.

TABLE 2

Effect of polymerization consitions on UHMWPE Properties:

| | | Ziegler-Natta catalyst compositions | | | | | Inert hydro. solvent | Polymerization Conditions (i) ethylene pressure; (ii) rpm; | Sequence of Addition of the Ziegler- | Polymer of ethylene monomers with ultrahigh molecular weight (UHMWPE) | | | | |
|---|---|---|---|---|---|---|---|---|---|---|---|---|---|---|
| Polym. Ex. Nos. | Cat. Comp. | Ti (mmol) (A) | Al (mmol) (B) | Si* (mmol) (C) | Al/Ti molar ratio | Si/Ti molar ratio | Varsol (L) (D) | (iii) Polym. time; and (iv) Polym. Temp.; | Natta catalyst components | Yield (g/g cat) | Bulk Density (g/cc) | RSV (dl/g) | MW (M) | Polymer morphology |
| Ex.-11 | Ex.-1 | 0.173 | 17.3 | 0.35 | 100 | 2 | 0.5 | (i) 2.5 bar; (ii) 500 rpm; (iiii) 2 hours; and (iv) 75° C. | D + B + A + C | 2433 | 0.2041 | 52.1 | 12.1 | Flaky, porous |
| Ex.-12 | Ex.-1 | 0.173 | 17.3 | 0.35 | 100 | 2 | 0.5 | Same as Ex-11, except using 0.2 bars hydrogen | D + B + A + C | 1311 | 0.3021 | 12.7 | 1.7 | Solid less porous |

TABLE 2-continued

Effect of polymerization consitions on UHMWPE Properties:

| | Ziegler-Natta catalyst compositions | | | | | Inert hydro. solvent | Polymerization Conditions (i) ethylene pressure; (ii) rpm; | Sequence of Addition of the Ziegler- | Polymer of ethylene monomers with ultrahigh molecular weight (UHMWPE) | | | | |
|---|---|---|---|---|---|---|---|---|---|---|---|---|---|
| Polym. Ex. Nos. | Cat. Comp. | Ti (mmol) (A) | Al (mmol) (B) | Si* (mmol) (C) | Al/Ti molar ratio | Si/Ti molar ratio | Varsol (L) (D) | (iii) Polym. time; and (iv) Polym. Temp.; | Natta catalyst components | Yield (g/g cat) | Bulk Density (g/cc) | RSV (dl/g) | MW (M) | Polymer morphology |
| Ex.-13 | Ex.-1 | 0.173 | 17.3 | 0.35 | 100 | 2 | 0.5 | Same as Ex-11, except the polymerization time: 1 hour | D + B + A + C | 881 | 0.2031 | 28.9 | 5.4 | Flaky, porous |
| Ex.-14 | Ex.-1 | 0.173 | 17.3 | 0.35 | 100 | 2 | 0.5 | Same as Ex-11, except the polymerization time: 0.5 hours | D + B + A + C D + B + A + C | 471 | 0.1901 | 28.9 | 5.4 | Flaky, porous |
| Ex.-15 | Ex.-1 | 0.173 | 17.3 | 0.35 | 100 | 2 | 0.5 | Same as Ex-11, except the polymerization temp. 60° C. | D + B + A + C | 755 | 0.3041 | 51.4 | 11.9 | Solid, less porous |

*external electron donor is tetraethoxysilane; and
RSV: relative or reduced specific viscosity.

In case of Ex-12, the polymerization was carried out in the presence of hydrogen as a chain transfer agent. It is evident from the data tabulated in Table-2 that in case of Ex-12, the molecular weight of UHMWPE has significantly dropped down as compared to the molecular weight of UHMWPE obtained in Example-11 whereas slight increase in the bulk density indicated more of chain entanglement. The lowering of polymerization temperature by 15° C. (Ex-15) did not increase the molecular weight of UHMWPE however the yield of UHMWPE dropped down as expected and bulk density increased thereby indicating more chain entanglement. Further, as the polymerization progressed over time (comparing Ex-11, Ex-13 and Ex-14), the molecular weight of 12 million was reached only around 2 hours. At the polymerization time interval of 0.5 to 1.0 hour, the molecular weight was only 5.4 million. The yield of UHMWPE also increased over time. Since the bulk density was more or less same and on the lower side, there was no indication of increased chain entanglement. The bulk density also had an effect on the polymer morphology as can be seen from table-2.

Examples 16-20 (Ex-16 to Ex-20)

The polymerization of ethylene monomers was carried out in the same manner as described in Example-11, except by using the Ziegler-Natta catalyst compositions of examples 6-10 having different electron donor compounds. The effect of Lewis basicity of the different electron donors used in modifying the catalyst composition and their implications on the UHMWPE properties can be envisaged from table-3.

TABLE 3

Effect of external electron donors on UHMWPE properties:

| | Ziegler-Natta catalyst compositions | | | | | | Inert hydro. solvent | Polymer of ethylene monomers with ultrahigh molecular weight (UHMWPE) | | | | | |
|---|---|---|---|---|---|---|---|---|---|---|---|---|---|
| Polym. Ex. Nos. | Cat. Comp. | Ti (mmol) (A) | Al (mmol) (B) | Si (mmol) (C) | Al/Ti molar ratio | Si/Ti molar ratio | Varsol (Lit) (D) | Yield (g/g cat) | Bulk Density (g/cc) | RSV (dl/g) | MW (M) | Polymer morphology |
| Ex-16 | Ex-6 | 0.173 | 8.6 | 0.35[a] | 50 | 2 | 0.5 | 676 | 0.1808 | 46.5 | 10.4 | Flaky porous |
| Ex-17 | Ex-7 | 0.173 | 8.6 | 1.03[b] | 50 | 2 | 0.5 | 963 | 0.1971 | 37.3 | 7.7 | Flaky porous |
| Ex-18 | Ex-8 | 0.173 | 8.6 | 1.03[c] | 50 | 2 | 0.5 | 1249 | 0.1961 | 39.4 | 8.2 | Flaky porous |
| Ex-19 | Ex-9 | 0.173 | 8.6 | 1.03[d] | 50 | 2 | 0.5 | 901 | 0.2011 | 48.6 | 11.0 | Flaky porous |
| Ex-20 | Ex-10 | 0.173 | 8.6 | 1.03[e] | 50 | 2 | 0.5 | 1045 | 0.2051 | 42.2 | 9.0 | Flaky porous |

[a]Tetraethoxysilane;
[b]Methyltrimethoxysilane;
[c]Cyclohexylmethyldimethoxy silane;
[d]Dicyclopentyldimethoxy silane; and
[e]Diphenyldimethoxysilane
Polymerization performed at 2.5 bar ethylene pressure, 75° C.; 500 rpm; 2 hours; mode of addition of the component of the Ziegler-Natta catalyst composition: D + B + A + C As it is evident from the data tabulated in Table-3, the molecular architecture of the electron donor along with its basicity is able to control the molecular weight and yield of the UHMWPE polymer thereby retaining the polymer morphology with no adverse effect on chain entanglement.

Examples 21-23 (Ex-21 to Ex-23)

The polymerization of ethylene monomers was carried out in the same manner as described in Example-11, except using the Ziegler-Natta catalyst compositions of examples 2-4 having different Si/Ti molar ratio.

Table 4 illustrates the threshold value of Si/Ti ratio required for achieving maximum molecular weight of 12.1 million, porous and flaky morphology, and optimized chain disentanglement.

TABLE 4

Effect of Si/Ti molar ratio on UHMWPE properties:

| Polym. Ex. Nos. | Cat. Comp. | Ziegler-Natta catalyst compositions | | | | | Inert Hydro. solvent | Polymer of ethylene monomers with ultrahigh molecular weight (UHMWPE) | | | | |
|---|---|---|---|---|---|---|---|---|---|---|---|---|
| | | Ti (mmol) (A) | Al (mmol) (B) | Si* (mmol) (C) | Al/Ti molar ratio | Si/Ti molar ratio | Varsol (Lit) (D) | Yield (g/g cat) | Bulk Density (g/cc) | RSV (dl/g) | MW (M) | Polymer morphology |
| Ex-11 | Ex-1 | 0.173 | 17.3 | 0.35 | 100 | 2 | 0.5 | 2433 | 0.2041 | 52.1 | 12.1 | Flaky, porous |
| Ex-21 | Ex-2 | 0.173 | 17.3 | 0.69 | 100 | 4 | 0.5 | 946 | 0.1791 | 45.1 | 9.9 | Flaky, porous particles |
| Ex-22 | Ex-3 | 0.173 | 17.3 | 0.175 | 100 | 1 | 0.5 | 1200 | 0.2010 | 39.4 | 8.2 | Flaky, porous particles |
| Ex-23 | Ex-4 | 0.173 | 17.3 | 0 | 100 | 0 | 0.5 | 5028 | 0.3109 | 21.8; | 3.7 | Solid less porous particles |

*external electron donor is tetraethoxysilane

Examples 24 (Ex-24)

The polymerization of ethylene monomers was carried out in the same manner as described in Example-11, except by using the Ziegler-Natta catalyst composition of example 5 having different Al/Ti molar ratio. The result of the polymerization process was provided in Table-5.

Table 5 indicates the threshold value of Al/Ti required for achieving maximum molecular weight of 12.1 million with enhanced catalyst productivity and also retaining the other desired polymer characteristics.

TABLE 5

Effect of Al/Ti molar ratio on the polymer properties:

| Polym. Ex. Nos. | Catal. Comp. | Ziegler-Natta catalyst compositions | | | | | Inert Hydro. solvent | Polymer of ethylene monomers with ultrahigh molecular weight (UHMWPE) | | | | |
|---|---|---|---|---|---|---|---|---|---|---|---|---|
| | | Ti (mmol) (A) | Al (mmol) (B) | Si* (mmol) (C) | Al/Ti molar ratio | Si/Ti molar ratio | Varsol (Lit) (D) | Yield (g/g cat) | Bulk Density (g/cc) | RSV (dl/g) | MW (M) | Polymer morphology |
| Ex-11 | Ex-1 | 0.173 | 17.3 | 0.35 | 100 | 2 | 0.5 | 2433 | 0.2041 | 52.1 | 12.1 | Flaky, porous |
| Ex-16 | Ex-6 | 0.173 | 8.6 | 0.35 | 50 | 2 | 0.5 | 676 | 0.1808 | 46.5 | 10.4 | Flaky, porous |
| Exm-22 | Ex-3 | 0.173 | 17.3 | 0.175 | 100 | 1 | 0.5 | 1200 | 0.2010 | 39.4 | 8.2 | Flaky, porous |
| Exm-24 | Ex-5 | 0.173 | 8.6 | 0.35 | 50 | 1 | 0.5 | 840 | 0.1938 | 40.9 | 8.7 | Flaky, porous |

*external electron donor is tetraethoxysilane

The effect of different process conditions on the thermal characteristics of the UHMWPE can be seen in Table 6.

TABLE 6

Thermal characteristics of UHMWPE:

| Polym. Ex. Nos. | Al/Ti molar ratio | Si/Ti molar ratio | RSV (dl/g) | MW (M) | Polymer morphology | $Tm_1$ (° C.) | $\Delta H1$ (J/g) | $Tc_1$ | Crystallinity (%) |
|---|---|---|---|---|---|---|---|---|---|
| Ex-21 | 100 | 4 | 45.1 | 9.9 | Flaky porous* | 141.4 | 162.7 | 120.8 | 55.7 |
| Ex-23 | 100 | 0 | 21.8 | 3.7 | Solid less porous* | 141.1 | 161.4 | 120.8 | 55.2 |
| Ex-11 | 100 | 2 | 52.1 | 12.1 | Flaky porous* | 141.6 | 170.1 | 121.5 | 58.2 |
| Ex-16 | 100 | 2 | 46.5 | 10.4 | Flaky porous* | 141.7 | 166.7 | 121.2 | 57.1 |
| Ex-24 | 50 | 1 | 40.9 | 8.7 | Flaky porous* | 141.7 | 165.9 | 121.2 | 56.8 |
| Ex-22 | 100 | 1 | 39.4 | 8.2 | Flaky porous* | 141.2 | 165.5 | 121.1 | 56.3 |
| Ex-12 | 50 | 2 | 12.7 | 1.7 | Solid less porous** | 139.9 | 185.7 | 122.6 | 63.4 |
| Ex-13 | 100 | 2 | 28.9 | 5.4 | Flaky porous*** | 142.1 | 177.9 | 122.2 | 60.7 |
| Ex-14 | 100 | 2 | 28.9 | 5.4 | Flaky porous# | 142.2 | 189.7 | 122.3 | 64.8 |
| Ex-15 | 100 | 2 | 51.4 | 11.9 | Solid less porous†† | 142.2 | 170.6 | 122.5 | 58.2 |
| Ex-17 | 50 | 2 | 37.3 | 7.7 | Flaky porous* | 142.1 | 230 | 122.1 | 78.5 |
| Ex-18 | 50 | 2 | 39.4 | 8.2 | Flaky porous* | 142.2 | 180.3 | 122.5 | 61.5 |
| Ex-19 | 50 | 2 | 48.6 | 11.0 | Flaky porous* | 142.2 | 143.9 | 123.8 | 49.1 |
| Ex-20 | 50 | 2 | 42.2 | 9.0 | Flaky porous* | 142.4 | 163.7 | 122.6 | 55.9 |

*Polymerization performed at 2.5 bar ethylene pressure, 75° C.; 500 rpm; 2 hours;
**0.2 bar $H_2$ was also added during the polymerization;
***Polymerization time: 1 hour only;
Polymerization time: 0.5 hour only; and
††Polymerization temperature: 60° C.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

TECHNICAL ADVANCEMENT

The present disclosure, related to Ziegler-Natta catalyst compositions, a process for their preparation and a process for polymerizing ethylene and other olefin monomers to produce polymers and copolymers of ethylene having ultra-high molecular weight, has several technical advancements, including but not limited to the realization of:

Obviates the use of costly single site metallocene catalyst compositions under cryogenic conditions, thereby making the process of the present disclosure economical and environment friendly, Use of modified heterogeneous Ziegler-Natta catalyst composition prevents reactor fouling as experienced in case of conventional processes employing homogeneous single site catalyst.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary.

While considerable emphasis has been placed herein on the preferred embodiments, it will be appreciated that many embodiments can be made and that many changes can be made in the preferred embodiments without departing from the principles of the disclosure. These and other changes in the preferred embodiments as well as other embodiments of the disclosure will be apparent to those skilled in the art from the disclosure herein, whereby it is to be distinctly understood that the forgoing descriptive matter to be implemented merely as illustrative of the disclosure and not as limitation.

The invention claimed is:

1. A Ziegler-Natta catalyst composition for preparing polymers of ethylene monomers having ultrahigh molecular weight, said composition comprising:
   i. a pro-catalyst component containing a reaction product of a magnesium containing compound and a titanium containing compound, wherein said pro-catalyst component comprises magnesium, titanium and chlorine in an amount ranging between 15 and 18 mole %; 20 and 23 mole %; and 60 and 64 mole %, respectively, all proportions being with respect to the pro-catalyst component;

ii. a co-catalyst component comprising at least one organoaluminum compound; and
iii. at least one external electron donor compound selected from the group of organosilane compounds having the general formula (I),

wherein $R^1$, $R^2$, $R^3$ and $R^4$ are all the same, or all are different, or some are the same, and are individually selected from the group consisting of linear or branched alkyl groups, cycloalkyl groups, aryl groups, alkoxy and aryloxy groups,
wherein the aluminum to titanium molar ratio ranges from 50:1 to 100:1.

2. The Ziegler-Natta catalyst composition as claimed in claim 1, wherein the molar ratio of magnesium, titanium and chlorine is 1:1.3:3.7.

3. The Ziegler-Natta catalyst composition as claimed in claim 1, wherein the co-catalyst component is at least one compound selected from the group consisting of methylaluminoxane, triisobutylaluminoxane, ethylaluminoxane, and polymethylaluminoxane.

4. The Ziegler-Natta catalyst composition as claimed in claim 1, wherein said magnesium containing compound is at least one compound selected from the group consisting of magnesium halides, magnesium alkoxides, magnesium aryloxides, magnesium oxides, magnesium oxyhalides and magnesium salts of inorganic acids.

5. The Ziegler-Natta catalyst composition as claimed in claim 1, wherein said magnesium containing compound is a compound selected from magnesium ethoxide and magnesium chloride.

6. The Ziegler-Natta catalyst composition as claimed in claim 1, wherein said titanium containing compound is at least one compound selected from the group consisting of titanium halides, titanium alkoxides, titanium aryloxide, titanium oxides and titanium halo oxides.

7. The Ziegler-Natta catalyst composition as claimed in claim 1, wherein said titanium containing compound is titanium tetrachloride.

8. The Ziegler-Natta catalyst composition as claimed in claim 1, wherein the organosilane compound is at least one compound selected from the group consisting of tetraethoxysilane, cyclohexylmethyl dimethoxysilane, dicyclopentyl dimethoxysilane, isobutylisopropyl dimethoxy silane, n-propyltriethoxy silane, isobutyltriethoxy silane, phenyltriethoxy silane, diisopropyldimethoxy silane, diethyldimethoxy silane, diisobutyldimethoxy silane, aminopropyltriethoxy silane, diphenyldimethoxy silane and methyltrimethoxy silane.

9. The Ziegler-Natta catalyst composition as claimed in claim 1, wherein silicon to titanium molar ratio ranges from 1:1 to 4:1.

10. A process for preparing a Ziegler-Natta catalyst composition of claim 1, said process comprising the following steps:
i. reacting a pre-determined weight proportion of at least one magnesium containing compound and at least one titanium containing compound at elevated temperature and pressure for a pre-determined period of time to obtain a pro-catalyst component, wherein at least one of the titanium containing compound and the magnesium containing compound is a chloride compound;
ii. isolating said pro-catalyst component;
iii. adding a pre-determined weight proportion of an organoaluminum compound to an inert hydrocarbon liquid medium to obtain a mixture;
iv. adding to said mixture, said pro-catalyst component and agitating the obtained mass for a pre-determined period of time to obtain a mass containing an activated pro-catalyst component; and
v. adding a pre-determined weight proportion of at least one external electron donor compound to the mass and agitating further for a pre-determined period of time to obtain a Ziegler-Natta catalyst composition.

11. The process as claimed in claim 10, wherein the organoaluminum compound is selected from the group consisting of methylaluminoxane, triisobutylaluminoxane, ethylaluminoxane, and polymethylaluminoxane.

12. The process as claimed in claim 10, wherein said inert hydrocarbon liquid medium is at least one medium selected from the group consisting of pentane, hexane, cyclohexane, methyl cyclohexane, heptane, octane, decane, isopentane, and varsol.

13. A process for polymerization of ethylene monomers in the presence of the Ziegler-Natta catalyst composition of claim 1, said process comprising the following steps:
contacting ethylene monomers with a Ziegler-Natta catalyst composition of claim 1 under polymerization reaction conditions of temperature ranging from 50 to 80° C., ethylene pressure ranging from 1 to 15 bars for a time period ranging from 1 to 5 hours and with agitation speed ranging from 300 to 1000 revolutions per minute (rpm) to obtain a polymer of ethylene having ultrahigh molecular weight.

14. A polymer of ethylene monomers having ultrahigh molecular weight prepared in accordance with the process as claimed in claim 13, wherein the polymer of ethylene has a molecular weight ranging from 2 to 13 million g/mole; an intrinsic viscosity ranging from 18 to 54 dl/g; a bulk density ranging from 0.1 to 0.3 g/cc; crystallinity ranging from 50 to 70%; and porous and flaky morphology.

* * * * *